No. 883,700. PATENTED APR. 7, 1908.
A. B. DRÄGER.
HYDRAULIC SEAL SAFETY VALVE.
APPLICATION FILED AUG. 7, 1907.
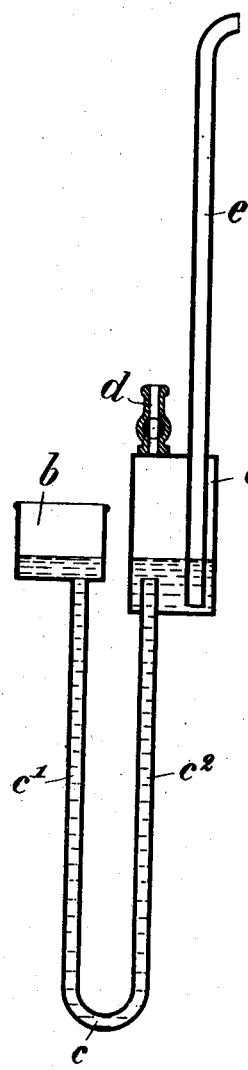
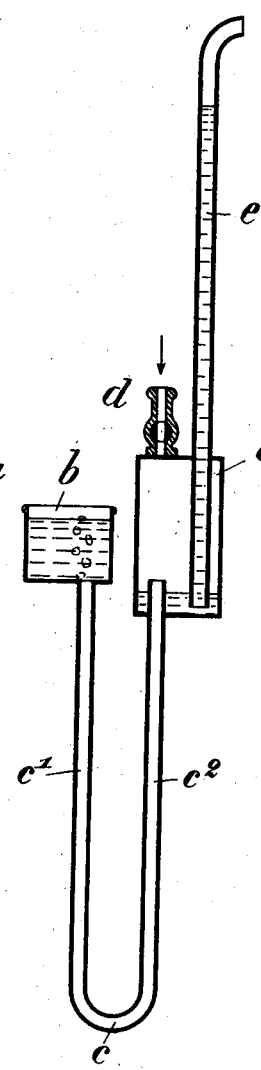
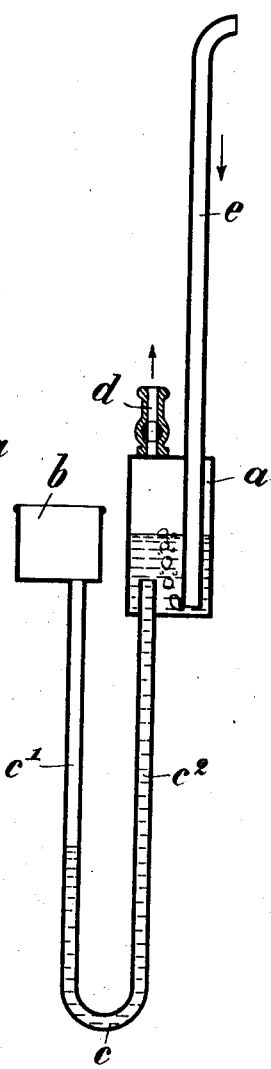
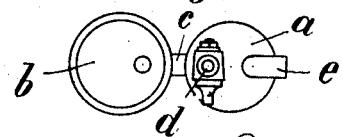
Witnesses.
Jesse K. Lutton.
B. K. Sommers
Inventor.
Alexander Bernhard Dräger.
by Henry Orth
Atty.

UNITED STATES PATENT OFFICE.

ALEXANDER BERNHARD DRÄGER, OF LÜBECK, GERMANY, ASSIGNOR OF ONE-HALF TO THE FIRM OF DRÄGERWERK, HEINR. & BERNH. DRÄGER, OF LÜBECK, GERMANY, AND ONE-HALF TO ERNST WISS, OF GRIESHEIM-ON-THE-MAIN, GERMANY.

HYDRAULIC-SEAL SAFETY-VALVE.

No. 883,700.  Specification of Letters Patent.  Patented April 7, 1908.

Application filed August 7, 1907. Serial No. 387,537.

*To all whom it may concern:*

Be it known that I, ALEXANDER BERNHARD DRÄGER, a subject of the Emperor of Germany, and resident of Lübeck, in Germany, have invented a certain new and useful Improvement in Hydraulic-Seal Safety-Valves, of which the following is a specification.

The present invention relates to hydraulic seal-safety valves, such as are usually employed in connection with gas-blowpipes for instance where acetylene and oxygen is used for welding iron- or steel-plates. Hydraulic seal-safety-valves known heretofore prevent, it is true, the entrance of oxygen into the reservoir for the fuel (acetylene or the like) when counter currents arise, but they do not prevent atmospheric air from being drawn in, when fuel is to be sucked by means of an ejector as for instance in acetylene welding burners.

In the known devices a safety-pipe leads from the hydraulic seal tank from above the mouth of the gas-feed-pipe upwards to an open tank situated at some higher place. When the pressure of the oxygen increases beyond a certain limit it drives the water of the seal upwards into the said safety-pipe until the surface of the water sinks to the mouth of this pipe. The surplus of oxygen then escapes by way of the same pipe and the upper tank into the atmosphere, while the amount of water in the seal between the mouth of the gas-feed-pipe and that of the safety-pipe prevents the oxygen from entering the gas-feed-pipe. It is evident that if a lower pressure or a vacuum is created when aspirating the gas instead of the unallowed high pressure, air would pass into the seal by way of the safety-pipe and further into the pipe leading to the burner.

The object of the present invention is to construct an hydraulic seal safety valve, in which the drawback spoken of is not present. To this end the safety-pipe is not led upwards, but downwards and bent to the shape of a U, and the tank into which its end opens out, is about on the same height as the seal-tank.

The Figures 1 to 3 show the valve in three different stages of operation, in vertical section and Fig. 4 shows a plan.

In the apparatus shown the open tank $b$ is situated near the seal-tank $a$, at about the same height and connected therewith by the U-shaped pipe $c$. Into the seal-tank $a$ the gas-feed pipe $e$, which must have a greater length than one of the legs of the U-shaped pipe, projects close to the bottom, while the leg $c^2$ of the pipe $c$ opens out into this tank somewhat higher. To prevent water from splashing over into the gas-outlet pipe $d$, it is advisable to make the tank $a$ not too shallow. The length of the leg of the pipe $c$ decides the safety of the apparatus; for ordinary use it will be 0.5 to 1 meter As long as there is merely atmospheric pressure in the tank $a$, the water therein will be at the same level as in the open tank $b$, as is shown in Fig. 1, but when a counter current of the oxygen is formed thus increasing the pressure in the tank $a$ the water in the same will be pressed partly into the pipe $e$ and partly by way of the pipe $c$ into the tank $b$, until the level is lowered as far as the mouth of the leg $c^2$, whereupon on further increase of pressure the water in the pipe $c$ is pushed into the tank $b$, while at the same time the water in the pipe $e$ rises still further to balance the pressure. On still further increase of pressure oxygen escapes by way of the pipe $c$ and through the water in the tank $b$ into the atmosphere. The oxygen therefore cannot reach the mouth of the pipe $e$, which remains filled with water to a height corresponding to the length of the legs of the pipe $c$.

If there is a sucking action in the pipe $d$, to such an extent that the gas entering by the pipe $e$ is unable to destroy the vacuum in the tank $a$, the latter will be filled with water from the tank $b$ and the leg $c^1$ will become more or less empty according to the sucking power, Fig. 3, which rarely surpasses a column of water of 0.5 meter. The pipe $c$ therefore always remains partly filled with water and no air can enter the seal, which would cause undesired mixtures in the seal.

I claim:

1. An hydraulic seal-safety valve having a closed tank and an open tank in fixed relation, and a U-shaped pipe connecting both tanks, gas-inlet pipe and an outlet-pipe for the closed tank.

2. An hydraulic seal-safety valve having a closed tank and an open tank, a U-shaped pipe connecting both tanks and projecting into the closed tank at some distance from its bottom, a gas feed pipe opening into the closed tank below the mouth of the U-shaped pipe.

3. An hydraulic seal comprising a closed tank, an open tank on substantially the same level, a gas-inlet pipe opening into the closed tank near the bottom thereof, a conduit connecting the tanks above the mouth of the gas-inlet pipe and an outlet pipe in the closed tank.

4. An hydraulic seal comprising a closed tank, an open tank, a U-shaped pipe opening into said tanks on the same level, a gas-inlet pipe opening into the closed tank below the level of the opening of the U-shaped pipe, and a gas outlet in the closed tank above the outlet of the U-shaped pipe.

ALEXANDER BERNHARD DRÄGER.

Witnesses:
JOHANN HEINRICH DRÄGER,
FRIEDRICH PLATH.